US010249080B2

(12) United States Patent
Griffith

(10) Patent No.: US 10,249,080 B2
(45) Date of Patent: Apr. 2, 2019

(54) SYSTEMS AND METHODS FOR MULTI-DIMENSIONAL GEOPHYSICAL DATA VISUALIZATION

(71) Applicant: SHELL OIL COMPANY, Houston, TX (US)

(72) Inventor: Donald Paul Griffith, Cypress, TX (US)

(73) Assignee: SHELL OIL COMPANY, Houston, TX (US)

(*) Notice: Subject to any disclaimer, the term of this patent is extended or adjusted under 35 U.S.C. 154(b) by 7 days.

(21) Appl. No.: 15/524,198

(22) PCT Filed: Nov. 3, 2015

(86) PCT No.: PCT/US2015/058836
§ 371 (c)(1),
(2) Date: May 3, 2017

(87) PCT Pub. No.: WO2016/073483
PCT Pub. Date: May 12, 2016

(65) Prior Publication Data
US 2017/0358130 A1    Dec. 14, 2017

Related U.S. Application Data

(60) Provisional application No. 62/075,645, filed on Nov. 5, 2014.

(51) Int. Cl.
*G06T 17/05* (2011.01)
*G06T 11/00* (2006.01)

(52) U.S. Cl.
CPC ............ *G06T 17/05* (2013.01); *G06T 11/001* (2013.01)

(58) Field of Classification Search
CPC ................................ G06T 11/001; G06T 17/05
(Continued)

(56) References Cited

U.S. PATENT DOCUMENTS 9,008,972 B2 * 4/2015 Imhof ..................... G01V 1/32
702/13
9,595,129 B2 * 3/2017 Cheng ..................... G06T 15/08
(Continued)

OTHER PUBLICATIONS

McArdle NJ, Iacopini D, KunleDare MA, Paton GS. The use of geologic expression workflows for basin scale reconnaissance: A case study from the Exmouth Subbasin, North Carnarvon Basin, northwestern Australia. Interpretation. Jan. 31, 2014;2(1):SA163-77.*

(Continued)

*Primary Examiner* — Phu K Nguyen

(57) ABSTRACT

Example of systems and methods are provided for visualization of multi-dimensional geophysical data visualization. Combining several attributes from multi-dimensional geophysical data or seismic data using color modeling techniques provide for the interpretation of data more efficiently by a user. A color space is defined and multi-dimensional geophysical data attributes are created along with blending filters, such as asymmetric blending filters. Blended multi-dimensional geophysical data attribute cubes are created from the blending filters and the geophysical data attributes. The blended multi-dimensional geophysical data attributes or cubes are displayed using the defined multi-dimensional color space.

20 Claims, 3 Drawing Sheets

(58) Field of Classification Search
USPC .......................................................... 345/419
See application file for complete search history.

(56) References Cited

U.S. PATENT DOCUMENTS

| | | |
|---|---|---|
| 2011/0254843 A1 | 10/2011 | Chuter |
| 2014/0098097 A1 | 4/2014 | Lin |
| 2014/0188392 A1 | 7/2014 | Aarre |
| 2014/0278117 A1 | 9/2014 | Dobin et al. |

OTHER PUBLICATIONS

Marfurt, Kurt J., R. Lynn Kirlin, Steven L. Farmer, and Michael S. Bahorich. "3-D seismic attributes using a semblance-based coherency algorithm." Geophysics 63, No. 4 (1998): 1150-1165.*
International Search Report and Written Opinion received for PCT Patent Application No. PCT/US2015/058836, dated Feb. 17, 2016, 9 pages.
Das et al., "Application of Multi-Attributes and Spectral Decomposition with RGB blending for understanding the strati-structural features: A Case study", 10th Biennial International Conference & Exposition, 2013, pp. 1-8.

* cited by examiner

SYSTEMS AND METHODS FOR MULTI-DIMENSIONAL GEOPHYSICAL DATA VISUALIZATION

CROSS REFERENCE TO EARLIER APPLICATION

This application is a US national stage application of PCT/US2015/058836, filed Nov. 3, 2015, which claims priority benefits of U.S. Provisional Application No. 62/075,645, filed Nov. 5, 2011.

BACKGROUND

The present invention relates to a method for color mapping attributes from geophysical data and a system therefor. The present invention further relates to a non-transitory computer readable medium including code for performing such a method.

Interaction with multi-dimensional geophysical data is made available to a user through the use of visual displays. For example, three-dimensional (3D) picture quality displays of a particular or selected geophysical formation can be generated using 3D geophysical data, along with dedicated computer software and/or hardware.

Certain techniques allow for the co-visualized display of two or three 3D geophysical datasets using colors either from color look-up tables or using color spaces that provide photographic quality, such as RGB, CMY, HSL, or any other color spaces known to one of ordinary skill in the art. In one aspect, commercially available RGB blending techniques map three geophysical attributes to the three axes of a color cube. For example, a single attribute is mapped to just one color channel. As an example, a single attribute may be mapped to red, while another is mapped to green and a third is mapped to blue.

Many techniques exist for modeling geophysical data. For example, Stratigraphic Forward Modelling (SFM) tools are numerical, process-based software that aim to simulate tectonic and sedimentary processes controlling stratigraphic architecture. These tools can be classified according to the processes affecting sediment production, transport and deposition that they simulate, as well as the degree of the simplifications of these processes. SFM tools have been widely used to understand and illustrate controls on stratigraphy for a variety of sedimentary environments. Currently, there are a variety of SFM tools used in the context of hydrocarbon exploration, for building basin models or to help in predicting reservoir presence and characteristics.

Prior methods viewed layers or properties of a 3D geophysical data image from tools, such as an SFM tool, separately. For example, prior methods displayed images of the layers or properties as a series of side-by-side images, as a sequence of images varying through time as, for example, in a video sequencing image clip, or by using cross-sections to visualize several layers simultaneously but only for a single grid cell row. A user viewing these results would then need to assimilate the results from the multiple images before being able to provide an analysis of the 3D geophysical data. The user must visually view and scan for subtle changes between layers and/or between related properties of the separately displayed images. Such assimilation is a difficult and time-consuming task.

Prior methods exist for display of hyperspectral imagery where images for many individual spectral bands are combined for display using multi-dimensional color spaces. The prior art combines two-dimensional (2D) data recorded directly for each spectral band as measurements of surface properties either using aerial or satellite imaging. Standard practice is to select three bands from the numerous bands recorded, but methods to combine all recorded images have been presented.

The present invention aims to provide an improved method for analyzing multi-dimensional geophysical data, which relies on using a multi-dimensional color space to display the results from geophysical attributes that share at least two common coordinate references. For example, combining geophysical attributes that share a common X and Y grid, allows a user to view the geophysical attributes over a range of Z values.

SUMMARY

In one aspect, the invention provides a method for color mapping attributes from geophysical data, comprising the steps of:
  defining a multi-dimensional color space;
  defining two or more multi-dimensional geophysical attributes;
  defining three or more blending filters, wherein the number of blending filters defined equals the number of axes in the multi-dimensional color space, and wherein the three or more blending filters are defined based, at least in part, on two or more proportions associated with the two or more multi-dimensional geophysical attributes;
  defining two or more blending filter weights, wherein the number of blending filter weights corresponds to the number of multi-dimensional geophysical attributes, and wherein each of the two or more blending filter weights uniquely corresponds to one single associated multi-dimensional geophysical attribute of the number of multi-dimensional geophysical attributes;
  creating blended geophysical data attributes, wherein the number of blended geophysical data attributes created equals the number of axes in the multi-dimensional color space, and wherein the blended geophysical data attributes are created by combining the two or more multi-dimensional geophysical attributes using the associated two or more blending filter weights; and
  displaying the blended geophysical data attributes using the multi-dimensional color space, wherein each of the blended geophysical data attributes uniquely corresponds to one of the axes in the multi-dimensional color space.

In another aspect, the invention provides a system comprising:
  one or more processors for processing information;
  a memory communicatively coupled to the one or more processors; and
  one or more modules that comprise instructions stored in the memory, the instructions, when executed by the processor, operable to perform operations comprising:
  defining a multi-dimensional color space;
  defining two or more multi-dimensional geophysical attributes;
  defining three or more blending filters, wherein the number of blending filters defined equals the number of axes in the multi-dimensional color space, and wherein the three or more blending filters are defined based, at least in part, on two or more proportions associated with the two or more multi-dimensional geophysical attributes;

defining two or more blending filter weights, wherein the number of blending filter weights corresponds to the number of multi-dimensional geophysical attributes, and wherein each of the two or more blending filter weights uniquely corresponds to one single associated multi-dimensional geophysical attribute of the number of multi-dimensional geophysical attributes;

creating blended geophysical data attributes, wherein the number of blended geophysical data attributes created equals the number of axes in the multi-dimensional color space, and wherein the blended geophysical data attributes are created by combining the two or more multi-dimensional geophysical attributes using the associated two or more blending filter weights; and displaying the blended geophysical data attributes using the multi-dimensional color space, wherein each of the blended geophysical data attributes uniquely corresponds to one of the axes in the multi-dimensional color space.

In still another aspect, the invention provides non-transitory computer readable medium including code for performing a method, the method comprising:

defining a multi-dimensional color space;

defining two or more multi-dimensional geophysical attributes;

defining three or more blending filters, wherein the number of blending filters defined equals the number of axes in the multi-dimensional color space, and wherein the three or more blending filters are defined based, at least in part, on two or more proportions associated with the two or more multi-dimensional geophysical attributes;

defining two or more blending filter weights, wherein the number of blending filter weights corresponds to the number of multi-dimensional geophysical attributes, and wherein each of the two or more blending filter weights uniquely corresponds to one single associated multi-dimensional geophysical attribute of the number of multi-dimensional geophysical attributes;

creating blended geophysical data attributes, wherein the number of blended geophysical data attributes created equals the number of axes in the multi-dimensional color space, and wherein the blended geophysical data attributes are created by combining the two or more multi-dimensional geophysical attributes using the associated two or more blending filter weights; and displaying the blended geophysical data attributes using the multi-dimensional color space, wherein each of the blended geophysical data attributes uniquely corresponds to one of the axes in the multi-dimensional color space.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

Figure 1:
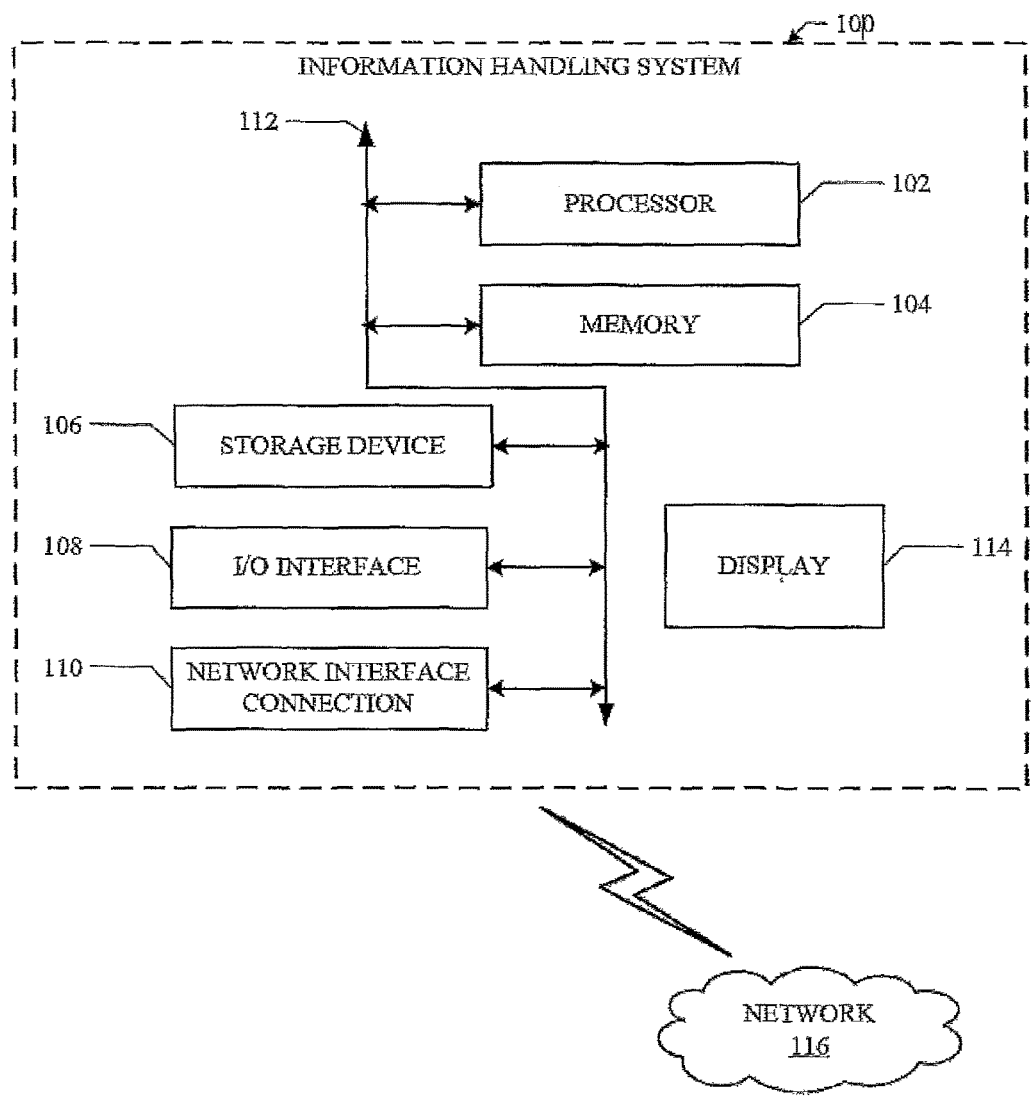
FIG. 1 shows an example information handling system according to one or more embodiments of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

The present disclosure relates generally to multi-dimensional geophysical data visualization through the use of computing systems and/or information handling systems, and, more particularly, to a method for simultaneously viewing many layers or properties associated with 3D geophysical data as a single two dimensional image. A user interacts with the computing system and/or information handling system via a graphical user interface (GUI). It is the user that ultimately interprets the multi-dimensional geophysical data—the GUI determines how fast and effective multi-dimensional geophysical data can be analyzed and interpreted by the user.

Users interact with multi-dimensional, such as 3D, geophysical data through visual displays. Such displays must take into consideration the interpretation by the user, such as how the eye processes light and how the physical display device displays light. For example, some displays are capable of producing 24-bit color which provides for about 16.8 million color variations. It is believed that a typical user can distinguish about 10 million colors. Certain color modeling techniques, allow for the display of multi-dimensional geophysical data with photographic quality. Several geophysical attributes from the multi-dimensional geophysical data such as, for example, 3D seismic data, may be combined using color modeling techniques in a way so as to acknowledge the visual perception capabilities of a user. For example, such displays are particularly useful when interpreting seismic data.

In accordance with the present disclosure, a method is herein disclosed for a novel technique for displaying geophysical data, particularly multi-dimensional geophysical data such as three-dimensional (3D) geophysical data. The novel technique involves using novel techniques to display the results in a multi-dimensional color space, such as a 3D color space. With many multi-dimensional geophysical measurements, the band-limited nature of the measurements results in data that has an average value of zero, with both positive and negative values. Certain attributes are defined for these types of multi-dimensional geophysical data to meaningfully blend data for display with multi-dimensional color spaces, since multi-dimensional color spaces are either additive or subtractive for combining colors, but cannot be both simultaneously. This blending typically requires utilizing geophysical attributes that reduce the multi-dimensional geophysical measurements to either positive or negative numbers, rather than both simultaneously. Some geophysical data such as layer thicknesses and net-to-gross ratios contain only positive numbers and do not require further modification. But these are typically estimated values, or attributes derived from the raw data, rather than measurements, themselves as with hyperspectral data. Combining several geophysical attributes from multi-dimensional, such as 3D, geophysical models renders the multi-dimensional, such as 3D, geophysical data easier to understand because human visual perception is acknowledged. Generally this means displays of the 3D geophysical data should have dark and bright patterns of the (multi-dimensional) geophysical data augmented with colors from, or derived from, additional geophysical attributes. Displays of 3D geophysical data that look less like amplitude maps and more like aerial photographs allow the user to engage in a better analysis and/or more meaningful interpretation of the geologic features of the visually-presented 3D geophysical data.

The method disclosed herein is technically advantageous because a method is provided for simultaneously viewing many layers or properties within a multi-dimensional model, such as a stratigraphic forward model (SFM), as a single two-dimensional (2D) image. The method is accomplished by using, for example, an RGB color model to display the result from a SFM tool. A user is then able to co-visualize layers or properties of the multi-dimensional geophysical data image in adjacent portions of a displayed multi-dimensional cube as a single image. As one example, RGB visualization provides images that may assist in reconciling baffled reservoir performance where both faults and shale-filled channels are present. The confidence level in recovery factor estimates may be increased by the display of technically advanced visual images where, for example, aquifer strength likely differs between commingled reservoirs. In another example, in deep waters with even deeper reservoirs, it is critical in planning the appraisal and development to recognize and understand if baffling or barriers are present. The color modeling rendering provides geologic detail that had not been previously observed.

Referring now to the drawings, the details of specific example embodiments are schematically illustrated. Like elements in the drawings will be represented by like numbers, and similar elements will be represented by like numbers with a different lower case letter suffix.

For one or more embodiments of the present invention, an information handling system may be utilized to display the geophysical data. Such embodiments may be implemented on virtually any type of information handling system regardless of the platform being used. For example, as shown in FIG. 1, an information handling system 100 includes one or more processor(s) 102, associated memory 104 (for example, random access memory (RAM), read-only memory (ROM), cache memory, flash memory, etc.), a storage device 106 (for example, a hard disk, solid state memory, an optical drive such as a compact disk drive or digital video disk (DVD) drive, a flash memory stick, etc.), and numerous other elements and functionalities typical of today's computers (not shown). The processor 102 may function to execute program instructions from one or more modules where the program instructions are stored in a memory device such as memory 104 or storage device 106 or any other memory known to one of ordinary skill in the art. The information handling system 100 may also include an I/O interface 108 for sending and/or receiving inputs, such as inputs from a keyboard, a mouse, or a microphone. I/O interface 108 may also receive multi-dimensional, such as 3D, geophysical data as required by any one or more embodiments of the present invention. For example, in certain embodiments, the multi-dimensional geophysical data may be seismic data. Further, the information handling system 100 may include output means, such as a display 114 (for example, a liquid crystal display (LCD), a plasma display, or cathode ray tube (CRT) monitor). Display 114 comprises the necessary elements to display color renderings of multi-dimensional geophysical data.

The information handling system 100 may be connected to a network 116 (for example, a local area network (LAN), a wide area network (WAN) such as the Internet, or any other similar type of network) via a network interface connection 110 to receive multi-dimensional geophysical data, such as 3D geophysical data, for example (3D) seismic data, or any other geophysical data known to one of ordinary skill in the art as required by any one or more embodiments of the present invention. Those skilled in the art will appreciate that many different types of information handling systems exist, and the aforementioned input and output means may take other forms. Generally speaking, the information handling system includes at least the minimal processing, input, and/or output devices, whether hardware, software or any combination thereof, necessary to practice embodiments of the invention.

Further, those skilled in the art will appreciate that one or more elements of the aforementioned information handling system 100 may be located at a remote location and connected to one or more other elements over a network. Further, embodiments of the invention may be implemented on a distributed system having a plurality of nodes, where each portion of the invention may be located on a different node within the distributed system. For example, the display 114 may be located remotely from the other components of the information handling system 100. Information handling system 100 may comprise one or more client devices, servers, or any combination thereof.

Figure 2:
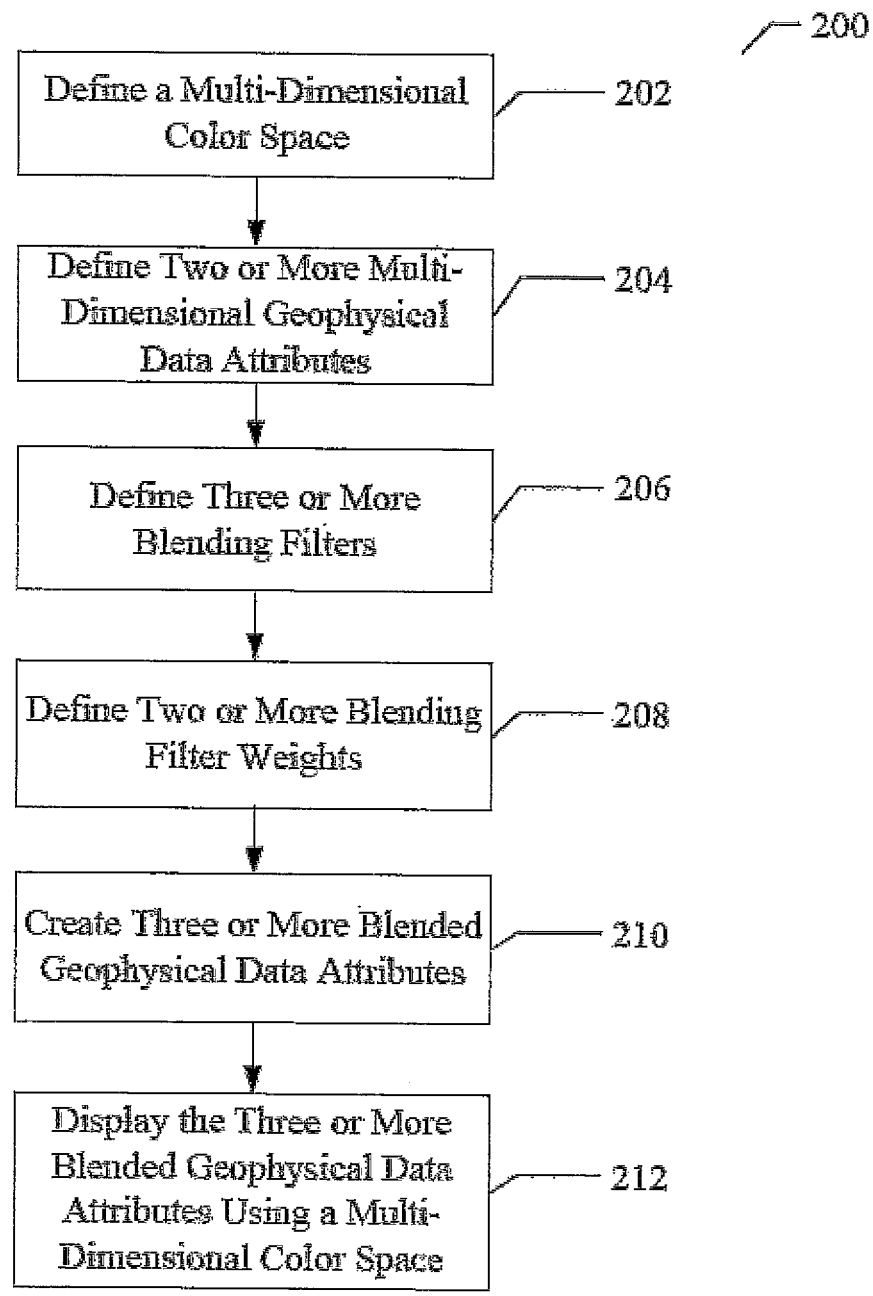
FIG. 2 flow diagram for color mapping geophysical attributes from three-dimensional geophysical data according to one or more embodiments of the present disclosure.

Referring to FIG. 2, depicted generally at 200 is a flow diagram for color mapping attributes derived from three-dimensional geophysical data. At step 202 a multi-dimensional color space is defined. The multi-dimensional color space has a number of axes, suitably one axis for each dimension of the multiple dimensions. For example, the color space may be any one of an RGB (including, but not limited to, Adobe RGB, sRGB, Rec. 709 and DCI P3, CIEXYZ, CIELAB, CMYK, HSL, or HSV color space or any other color space known to one of ordinary skill in the art.

At step 204, two or more multi-dimensional geophysical data attributes are defined. These attributes may be defined in any way known to one of ordinary skill in the art. For example, these attributes may be acquired from current or previously stored measurements. In one embodiment, the measurements may be acoustic measurements. As another example, these attributes may be calculated from current or previously stored data or may be pre-defined values. In one embodiment, these attributes are defined based, at least in part, on one or more depth parameter values. Such attributes may be defined by or based on, at least in part, spectral coefficients from three or more spectral sub-bands, three or more adjacent horizon slices where the slices are from above and below a mapped horizon, or three or more projections along lines with varying slope in a two-dimensional cross-plot of multi-component geophysical data such as, but not limited to, compressional and shear components or near and far angle substacks.

At step 206, blending filters are defined. The blending filters may be defined in any way known to one of ordinary skill in the art. In one or more embodiments, any one or more of the blending filters may be asymmetric blending filters. In one embodiment of a three-dimensional color space, at least two blending filters are mirror images of each other. In such an embodiment, the two mirror image blending filters may be asymmetric blending filters while the third blending filter is symmetric. It is contemplated by the present invention that the defined blending filters may be symmetric, asymmetric, or any combination of asymmetric and symmetric blending filters. The number of blending filters created equals the number of dimensions or axes in the multi-dimensional color space. The filter length of the blending filters equals the number of geophysical data attributes created. In one or more embodiments, any one or more of front-loaded, middle-loaded, and back loaded filters may be created. The blending filters are defined based, at least in part, by two or more proportions associated with the multi-dimensional geophysical attributes.

At step 208, two or more blending filter weights are defined. The weights may be defined in any way known to one of ordinary skill in the art. In one embodiment, the weights are derived from one or more blending filters. The weights may be defined using different blending filters for each weight. In another embodiment, the weights are defined based, at least in part, on a pre-defined value or criteria. The number of weights equals the number of multi-dimensional geophysical attributes defined. Each weight has a one-to-one correspondence with a single unique multi-dimensional geophysical attribute. That is, each weight corresponds to exclusively one unique associated multi-dimensional geophysical attribute and each multi-dimensional geophysical attribute corresponds to exclusively one weight. For example, a first multi-dimensional geophysical attribute has a corresponding first weight, a second multi-dimensional geophysical attribute has a corresponding second weight, and so on for each multi-dimensional geophysical attribute.

At step 210, the blended geophysical data attributes are created by combining the multi-dimensional geophysical attributes using the weights associated with each geophysical attribute. Blended geophysical data attributes may for instance be created by multiplying the multi-dimensional geophysical attributes with the associated two or more blending filter weights. Each of these blended geophysical data attributes may be uniquely created by using all or any combination of the geophysical attributes with the geophysical attributes blended differently for each blended geophysical data attribute. The blended geophysical data attributes may be derived using a different blending filter for each such blended geophysical data attribute. The number of blended geophysical data attributes created equals the number of axes in the multi-dimensional color space.

At step 212, the blended geophysical data attributes are displayed using the defined multi-dimensional color space. Each of the blended geophysical data attributes, for instance each of the three or more blended geophysical data attributes, uniquely corresponds to one of the axes in the multi-dimensional color space. Moreover, each of the axes in the multi-dimensional color space uniquely corresponds to exclusively one of the blended geophysical data attributes. In one embodiment, an RGB color space is defined with each of the three blended geophysical data attributes uniquely corresponding to the three axes of the defined color space.

Figure 3:
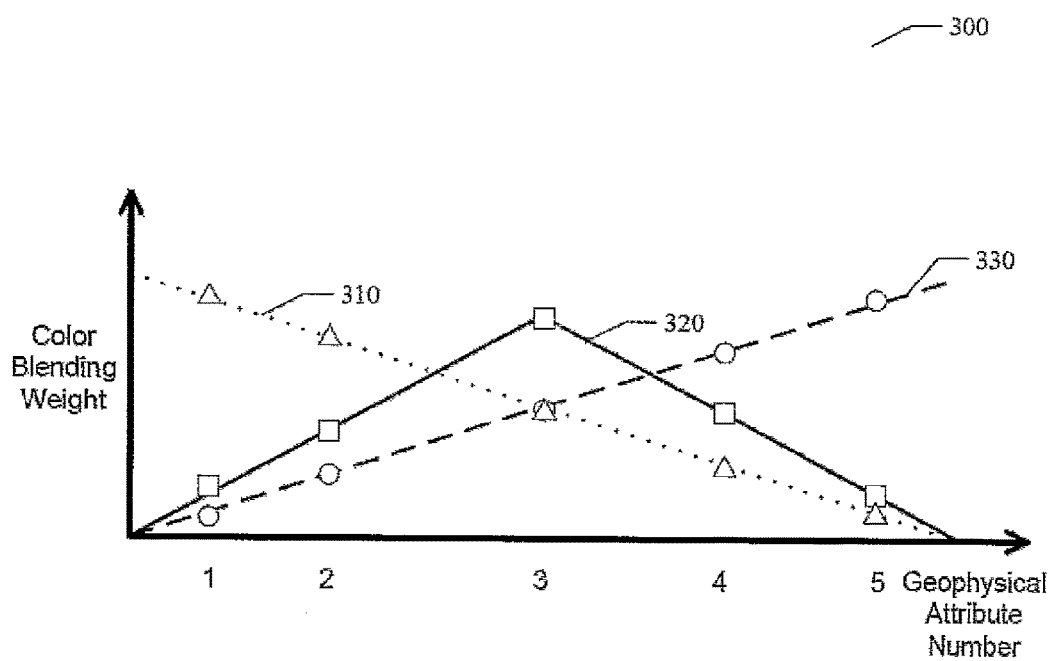
FIG. 3 is a crossplot of blending proportions.

Referring to FIG. 3, depicted generally at 300 is a crossplot depicting blending proportions. The embodiment depicted generally at 300 is a defined RGB color space. The blending filter for the Red axis is denoted by dashed line 330, the blending filter for the Blue axis is denoted by dotted line 310 and the blending filter for the Green axis is denoted by solid line 320. The x-axis is the attribute number and the y-axis is the color blending weight. The example shows five multi-dimensional geophysical attributes. Blending weights corresponding to each multi-dimensional geophysical attribute are denoted by a triangle for the Blue axis 310, a square for the Green axis 320 and a circle for the Red axis 330. Blended geophysical data attributes are created by combining the five multi-dimensional geophysical attributes using the five associated blending filter weights. The blended multi-dimensional Geophysical Attribute for the Red axis of the RGB color space in this example would be the sum of Geophysical Attribute number 1 multiplied by the weight of the blending filter for the Red axis denoted by the left-most circle above Geophysical Attribute 1, plus Geophysical Attribute number 2 multiplied by the weight of the blending filter for the Red axis denoted by the second circle above Geophysical Attribute 2, plus Geophysical Attribute number 3 multiplied by the weight of the blending filter for the Red axis denoted by the third circle above Geophysical Attribute 3, plus Geophysical Attribute number 4 multiplied by the weight of the blending filter for the Red axis denoted by the fourth circle above Geophysical Attribute 4, plus Geophysical Attribute number 5 multiplied by the weight of the blending filter for the Red axis denoted by the fifth circle above Geophysical Attribute 5. The blended multi-dimensional Geophysical Attributes for the Green and Blue axes of the RGB color space would be created in a similar manner using the weights from the blending filters for the Green axis and Blue axis of the RGB color space, respectively. In the embodiment depicted generally at 300, the blending filter 330 and the blending filter 310 are asymmetric blending filters while the blending filter 320 is a symmetric blending filter. Other embodiments may use any combination of symmetric and asymmetric blending filters.

The concepts disclosed herein should not be understood to be limited to the exemplary embodiments described, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The invention claimed is:

1. A method for color mapping attributes from geophysical data, comprising the steps of:

defining a multi-dimensional color space;

defining two or more multi-dimensional geophysical attributes;

defining three or more blending filters, wherein the number of blending filters defined equals the number of axes in the multi-dimensional color space, and wherein the three or more blending filters are defined based, at least in part, on two or more proportions associated with the two or more multi-dimensional geophysical attributes;

defining two or more blending filter weights, wherein the number of blending filter weights corresponds to the number of multi-dimensional geophysical attributes, and wherein each of the two or more blending filter weights uniquely corresponds to one single associated multi-dimensional geophysical attribute of the number of multi-dimensional geophysical attributes;

creating blended geophysical data attributes, wherein the number of blended geophysical data attributes created equals the number of axes in the multi-dimensional color space, and wherein the blended geophysical data attributes are created by combining the two or more multi-dimensional geophysical attributes using the associated two or more blending filter weights; and displaying the blended geophysical data attributes using the multi-dimensional color space, wherein each of the blended geophysical data attributes uniquely corresponds to one of the axes in the multi-dimensional color space.

2. The method of claim 1, wherein the two or more multi-dimensional geophysical attributes include at least one of one or more spectral coefficients from three or more spectral sub-bands, one or more adjacent horizon slices from above and below a mapped horizon, and one or more projections along lines with varying slope in a two-dimensional crossplot of multi-component geophysical data.

3. The method of claim 2, wherein the one or more projections include at least one of compressional and shear components and near and far angle substacks.

4. The method of claim 1, wherein the three or more blending filters comprise a filter length equal to the number of the two or more multi-dimensional geophysical attributes.

5. The method of claim 1, wherein the three or more blending filters comprise one or more of a front-loaded filter, a middle-loaded filter, and a back-loaded filter.

6. The method of claim 1, wherein at least one of the three or more blending filters is an asymmetric blending filter.

7. The method of claim 6, wherein each of the two or more blending filter weights is defined based, at least in part, on a unique one of the three or more blending filters.

8. The method of claim 1, wherein the multi-dimensional color space comprises one of an RGB, CIEXYZ, CIELAB, CMYK, HSL, or HSV color space.

9. A system comprising:
one or more processors for processing information;
a memory communicatively coupled to the one or more processors; and
one or more modules that comprise instructions stored in the memory, the instructions, when executed by the processor, operable to perform operations comprising:
defining a multi-dimensional color space;
defining two or more multi-dimensional geophysical attributes;
defining three or more blending filters, wherein the number of blending filters defined equals the number of axes in the multi-dimensional color space, and wherein the three or more blending filters are defined based, at least in part, by two or more proportions associated with the two or more multi-dimensional geophysical attributes;
defining two or more blending filter weights, wherein the number of blending filter weights corresponds to the number of multi-dimensional geophysical attributes, and wherein each of the two or more blending filter weights uniquely corresponds to one single associated multi-dimensional geophysical attribute of the number of multi-dimensional geophysical attributes;
creating blended geophysical data attributes, wherein the number of blended geophysical data attributes created equals the number of axes in the multi-dimensional color space, and wherein the blended geophysical data attributes are created by combining the two or more multi-dimensional geophysical attributes using the associated two or more blending filter weights; and
displaying the blended geophysical data attributes using the multi-dimensional color space, wherein each of the blended geophysical data attributes uniquely corresponds to one of the axes in the multi-dimensional color space.

10. The system of claim 9, wherein the two or more multi-dimensional geophysical attributes include at least one of one or more spectral coefficients from three or more spectral sub-bands, one or more adjacent horizon slices from above and below a mapped horizon, and one or more projections along lines with varying slope in a two-dimensional crossplot of multi-component geophysical data.

11. The system of claim 10, wherein the one or more projections includes at least one of compressional and shear components and near and far angle substacks.

12. The system of claim 9, wherein the three or more blending filters comprise a filter length equal to the number of the two more multi-dimensional geophysical data attributes.

13. The system of claim 9, wherein the three or more blending filters comprise one or more of a front-loaded filter, a middle-loaded filter, and a back-loaded filter.

14. The system of claim 9, wherein at least one of the three or more blending filters is an asymmetric blending filter.

15. The system of claim 9, wherein the two or more blending filter weights are defined based, at least in part, on a unique one of the three or more blending filters.

16. The system of claim 9, wherein the multi-dimensional color space comprises one of an RGB, CIEXYZ, CIELAB, CMYK, HSL, or HSV color space.

17. A non-transitory computer readable medium including code for performing a method, the method comprising:
defining a multi-dimensional color space;
defining two or more multi-dimensional geophysical attributes;
defining three or more blending filters, wherein the number of blending filters defined equals the number of axes in the multi-dimensional color space, and wherein the three or more blending filters are defined based, at least in part, on two or more proportions associated with the two or more multi-dimensional geophysical attributes;
defining two or more blending filter weights, wherein the number of blending filter weights corresponds to the number of multi-dimensional geophysical attributes, and wherein each of the two or more blending filter weights uniquely corresponds to one single associated multi-dimensional geophysical attribute of the number of multi-dimensional geophysical attributes;
creating blended geophysical data attributes, wherein the number of blended geophysical data attributes created equals the number of axes in the multi-dimensional color space, and wherein the blended geophysical data attributes are created by combining the two or more multi-dimensional geophysical attributes using the associated two or more blending filter weights; and
displaying the blended geophysical data attributes using the multi-dimensional color space, wherein each of the blended geophysical data attributes uniquely corresponds to one of the axes in the multi-dimensional color space.

18. The method of claim 17, wherein the two or more multi-dimensional geophysical attributes include at least one of one or more spectral coefficients from three or more spectral sub-bands, one or more adjacent horizon slices from above and below a mapped horizon, and one or more projections along lines with varying slope in a two-dimensional crossplot of multi-component geophysical data.

19. The method of claim 17, wherein the two or more blending filter weights are defined based, at least in part, on a unique one of the three or more blending filters.

20. The method of claim 17, wherein the multi-dimensional color space comprises one of an RGB, CIEXYZ, CIELAB, CMYK, HSL, or HSV color space.

\* \* \* \* \*